United States Patent
Sullivan

(10) Patent No.: US 7,531,586 B2
(45) Date of Patent: *May 12, 2009

(54) PLASTICIZED POLYURETHANES FOR USE IN GOLF BALLS

(75) Inventor: Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/277,597

(22) Filed: Mar. 27, 2006

(65) Prior Publication Data

US 2006/0160936 A1     Jul. 20, 2006

Related U.S. Application Data

(62) Division of application No. 10/741,987, filed on Dec. 19, 2003, now Pat. No. 7,053,142.

(51) Int. Cl.
*A63B 37/06* (2006.01)
*A63B 37/00* (2006.01)
*C08L 75/00* (2006.01)
*C08K 5/12* (2006.01)
*C08K 5/521* (2006.01)

(52) U.S. Cl. .............. 524/141; 524/140; 524/143; 524/145; 524/296; 524/297; 525/92 C; 473/371; 473/374; 473/376; 473/378

(58) Field of Classification Search .......... None
See application file for complete search history.

(56) References Cited

U.S. PATENT DOCUMENTS

| | | | |
|---|---|---|---|
| 3,979,126 A | 9/1976 | Dusbiber | |
| 4,123,061 A | 10/1978 | Dusbiber | |
| 4,337,946 A | 7/1982 | Saito et al. | |
| 4,375,521 A | 3/1983 | Arnold | |
| 4,454,253 A | 6/1984 | Murphy et al. | |
| 5,334,673 A | 8/1994 | Wu | |
| 5,542,663 A | 8/1996 | Kato et al. | |
| 5,624,968 A * | 4/1997 | Gabbard ............... | 521/107 |
| 5,692,974 A | 12/1997 | Wu et al. | |
| 5,827,459 A | 10/1998 | Allen et al. | |
| 5,836,831 A | 11/1998 | Stanton et al. | |
| 5,849,392 A | 12/1998 | Hamada et al. | |
| 5,856,388 A | 1/1999 | Harris et al. | |
| 5,908,358 A | 6/1999 | Wu | |
| 5,947,843 A | 9/1999 | Calabria et al. | |
| 6,465,573 B1 | 10/2002 | Maruko et al. | |
| 6,503,157 B2 | 1/2003 | Yokota | |
| 6,548,618 B2 | 4/2003 | Sullivan et al. | |
| 6,849,675 B2 | 2/2005 | Sullivan | |
| 2002/0169037 A1* | 11/2002 | Sullivan ............... | 473/373 |
| 2003/0073517 A1 | 4/2003 | Ichikawa et al. | |
| 2004/0181014 A1 | 9/2004 | Kim et al. | |

FOREIGN PATENT DOCUMENTS

| | | |
|---|---|---|
| JP | 2002331048 | 11/2002 |
| WO | WO 98/37929 | 9/1998 |
| WO | WO 00/43449 | 7/2000 |
| WO | WO 00/57962 | 10/2000 |

OTHER PUBLICATIONS

Encyclopedia of Polymer Science vol. 2; 1985, p. 398.*
Encyclopedia of Polymer Science vol. 7; 1985, p. 807-810.*

* cited by examiner

*Primary Examiner*—David Buttner
(74) *Attorney, Agent, or Firm*—Mandi B. Milbank

(57) ABSTRACT

A golfball comprising a core and a cover layer, wherein at least one of the core or cover layer comprises a plasticized polyurethane composition comprising at least one polyurethane and at least one hydrophobic plasticizer selected from the group consisting of phthalates, phosphate esters, and mixtures thereof.

10 Claims, No Drawings

PLASTICIZED POLYURETHANES FOR USE IN GOLF BALLS

CROSS-REFERENCE TO RELATED APPLICATIONS

This application is a divisional of U.S. patent application Ser. No. 10/741,987, filed Dec. 19, 2003, now U.S. Pat. No. 7,053,142, the entire disclosure of which is hereby incorporated herein by reference.

FIELD OF THE INVENTION

The present invention relates to a golf ball and, more particularly, a golf ball core or cover component that includes a plasticized polyurethane material.

BACKGROUND OF THE INVENTION

Golf balls can generally be divided into two classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric material, and a cover. Solid balls have traditionally been considered longer and more durable than wound balls, but also lack the particular "feel" that is provided by the wound construction and typically preferred by accomplished golfers.

By altering ball construction and composition, manufacturers can vary a wide range of playing characteristics, such as resilience, durability, spin, and "feel," each of which can be optimized for various playing abilities. One golf ball component, in particular, that many manufacturers are continually looking to improve is the center or core. The core becomes the "engine" of the golf ball when hit with a club head. Generally, golf ball cores and/or centers are constructed with a polybutadiene-based polymer composition. Compositions of this type are constantly being altered in an effort to provide a targeted or desired coefficient of restitution ("COR") while at the same time resulting in a lower compression which, in turn, can lower the golf ball spin rate, provide better "feel," or both. This is a difficult task, however, given the physical limitations of currently-available polymers. As such, there remains a need for novel and improved golf ball core compositions.

Manufacturers also address the properties and construction of golf ball intermediate and cover layers. These layers have conventionally been formed of ionomer materials and ionomer blends of varying hardness and flexural moduli. This hardness range is still limited and even the softest blends suffer from a "plastic" feel according to some golfers. Recently, however, polyurethane-based materials have been employed in golf ball layers and, in particular, outer cover layers, due to its softer "feel" characteristics.

There remains a need, however, for improved polyurethane blends having further reduced or modified hardness and modulus while maintaining acceptable resilience and superior abrasion resistance and feel. The present invention provides such materials. Golf balls having components formed of plasticized polyurethanes ("PPU") or blends thereof have preferred characteristics of good resilience, durability, and "feel," while potentially providing a way for manufacturers to reduce costs compared to other materials having similar properties. Plasticizers are generally used in plastics (i.e., PVC) to adjust the hardness, flexibility, and processing characteristics. Plasticizers are also used in some commercial polyurethane elastomer formulations to provide products exhibiting higher flexibility, lower hardness, and lower rebound resulting in increased energy absorption. Therefore, the addition of PPU's to golf ball composition will allow for a wide range of physical properties, ranging from a very soft gel or gel-like material to a semi-rigid material, depending on the chemistry of the polyurethane and the amount of plasticizer used.

SUMMARY OF THE INVENTION

The present invention is directed to a golf ball comprising a core and a cover layer, wherein at least one of the core or cover layer comprises a polyurethane composition comprising a plasticizer. The plasticizer is preferably selected from the group consisting of alkyl adipates, alkyl phthalates, alkyl azelates, alkyl benzoates, alkyl citrates, soy and linseed oils, and mixtures thereof. The preferred plasticizer is dialkyl phthalate. Alternatively, the plasticizer comprises $C_3$-$C_{10}$ dialkyl adipates, $C_3$-$C_{10}$ dialkyl phthalates, or acetyl tributyl citrate; or the plasticizer comprises dibutyl phthalate, bis(2-ethylhexyl) phthalate, diisopropyl adipate, dibutyl adipate, bis(2-ethylhexyl) adipate, acetyl tributyl citrate, or a mixture thereof. In one embodiment, the plasticized polyurethane composition comprises a foamable polyurethane compound produced by the reaction of a polyol and toluene diisocyanate, an amount of a non-halogen containing foaming agent sufficient to produce a foam from the polyurethane compound, and a non-halogen containing plasticizer selected from the group consisting of phthalate plasticizers and phosphate ester plasticizers. If the PPU is a non-halogen foaming agent, preferably the non-halogen containing foaming agent is water or a non-halogen containing gas. More preferably, the non-halogen containing foaming agent is water. Most preferably, the non-halogen containing plasticizer is a phosphate ester.

In another embodiment, the phosphate ester comprises 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, isopropylated triphenyl phosphate, or a mixture thereof. Preferably, the phosphate ester comprises 2-ethyl hexyl diphenyl phosphate and isodecyl diphenyl phosphate. The phthalate plasticizer may comprise diisononyl phthalate, dihexyl phthalate, diheptyl phthalate, butyl octyl phthalate, linear dialkyl phthalate wherein the alkyl groups are independently carbon chains having from seven to eleven carbon atoms, and butyl cyclohexyl phthalate. Alternatively, the non-halogen containing plasticizer is an alkyl aryl phthalate.

In an alternative embodiment, the alkyl aryl phthalate comprises butyl benzyl phthalate, alkyl benzyl phthalate wherein said alkyl group has a carbon chain having from seven to nine carbon atoms, and texanol benzyl phthalate. Ideally, the composition further comprises synthetic polyisoprene, natural polyisoprene, polybutadiene, butyl rubber, polynorbornene, ethylene-propylene diene monomer rubber, or styrene-butadiene rubber, combined with high levels of oils, plasticizers, fillers, and mixtures thereof.

The ball construction may be any construction, but preferably the core comprises a center and an outer core layer. At least one of the center or the core layer comprises the plasticized polyurethane. It is preferred that the cover comprises an inner cover layer and an outer cover layer and, if so, at least one of the inner or outer cover layers comprises the plasticized polyurethane. In one embodiment, at least one of the inner or outer cover layer has a thickness of less than about 0.05 inches; the core has an outer diameter of at least about 1.55 inches; and/or the core has an outer diameter of between about 1.57 inches and about 1.62 inches.

The plasticizer may also comprise phthalic acid esters; aliphatic dibasic acid esters; trimellitate esters; fatty acid esters; benzoic esters; aliphatic phosphates; aromatic phosphates; halogenated aliphatic phosphates; and mixtures thereof In a preferred embodiment, the plasticizer comprises a hydrophobic plasticizer. If so, the hydrophobic plasticizer comprises aromatic esters selected from the group consisting of dibutyl phthalate, dioctyl phthalate, diheptyl phthalate, bis (2-ethylhexyl) phthalate, dicyclohexyl phthalate, butyl lauryl phthalate, diisooctyl phthalate, butylcoconutalkyl phthalate, ditridecyl phthalate, dilauryl phthalate, diisodecyl phthalate, butylbenzyl phthalate, octyldecanoyl phthalate, dimethylglycol phthalate, ethylphthalyl ethylene glycolate, methylphthalyl ethylene glycolate, butylphthalyl ethylene glycolate, dinonyl phthalate, diheptyl phthalate, octyldecyl phthalate, ditridecyl phthalate, dicapryl phthalate, bis(3,5,5-trimethylhexyl) phthalate, isooctylisodecyl phthalate, bis(diethyleneglycolmonomethylether) phthalate, and benzphenol.

Alternatively, the hydrophobic plasticizer may comprise aliphatic esters selected from the group consisting of mono-, di-, or polyester of higher fatty acid having 8 or more carbons with di-, tri-, or polyhydric alcohol, glycerin monostearate, glycerin 12-hydroxy stearate, glycerin distearate, diglycerin monostearate, tetraglycerin monostearate, glycerin monolaurate, diglycerin monolaurate, tetraglycerin monolaurate, polypropylene adipate, diisodecyl adipate, bis(2-methylhexyl) adipate, dicapryl adipate, diisooctyl adipate, octyldecyl adipate, isooctylisodecyl adipate, dibutyl fumarate, dioctylfumarate, triethyl citrate, acetyltriethyl citrate, tributyl citrate, is and acetyltributyl citrate.

Still alternatively, the hydrophobic plasticizer may comprise phosphate esters selected from the group consisting of tricresyl phosphate, phenyldicresyl phosphate, xylenyldicresyl phosphate, cresyldixylenyl phosphate, triphenyl phosphate, tributyl phosphate, trichloroethyl phosphate, trioctyl phosphate, tributyl phosphate, trichloroethyl phosphate, trioctyl phosphate, triethyl phosphate, and arylalyl phosphate. The hydrophobic plasticizer may also include epoxy compounds selected from the group consisting of butylepoxy stearate, octylepoxy stearate, epoxybutyl oleate, epoxidized butyl oleate, epoxidized soybean oil, epoxidized linseed oil, epoxidized alkyl oil, and epoxidized alkyl oil alcohol ester; and mixtures thereof.

In still another embodiment, the plasticizer is selected from the group consisting of alkyl adipates, alkyl phthalates, alkyl azelates, alkyl benzoates, alkyl citrates, similar soy and linseed oils, $C_3$-$C_{10}$ dialkyl adipates, $C_3$-$C_{10}$ dialkyl phthalates, acetyl tributyl citrate, dibutyl phthalate, bis(2-ethylhexyl) phthalate, diisopropyl adipate, dibutyl adipate, bis(2-ethylhexyl) adipate, acetyl tributyl citrate, phthalates, adipates, sebacates, azelates, trimellitates, glutarates, benzoates, alkyl alcohols, phosphates, and mixtures thereof.

Preferably, the polyurethane composition comprises a saturated polyurethane and/or the polyurethane composition comprises a UV absorber or a light stabilizer.

DETAILED DESCRIPTION OF THE INVENTION

The golf balls of the present invention may comprise any of a variety of constructions, from a simple two-piece core and cover, to a three piece dual core single cover to any multi-piece construction, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers. The core may also comprise a solid or liquid filled center around which many yards of a tensioned elastomeric material are wound.

Any of the core or cover components may be formed of or include a plasticized polyurethane, but preferably, at least one of the outer core layer, inner cover layer, or both, comprise a PPU. Plasticized polyurethanes are the combination of polyurethanes and plasticizers. Typically, polyurethanes are formed using conventional methods, such as by forming a prepolymer comprising a polyol and an isocyanate, followed by a curing agent. Plasticizers can be added at a variety of times prior to, during, or after formation of the urethane materials or blends. The PPU's may be added to the polyol reactive component, a prepolymer prepared from a polyol and an isocyanate, a curing agent for the prepolymer, any combination thereof, or to a one-shot system containing isocyanate, polyol, and curing agent that reacts upon application of heat. The PPU's may also be thermoplastic or thermosetting.

Suitable polyurethanes, polyureas, or epoxies, generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed maybe "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy} benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bispropylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

Suitable plasticizers for blending with the above-mentioned polyurethane materials include, but are not limited to, those disclosed in U.S. Pat. No. 3,489,723, which is incorporated herein, in its entirety, by express reference thereto. Exemplary plasticizers include phthalic acid esters, e.g., dibutyl phthalate, dioctyl phthalate, butyl benzyl phthalate, di-isodecyl phthalate; aliphatic dibasic acid esters, e.g., di-2-ethyl hexyl adipate, 2-ethyl hexyl sebacate; trimellitate esters, e.g., tri-2-ethyl hexyl trimellitate, tri-ocytl trimellitate; fatty acid esters, e.g., butyl oleate; benzoic esters, e.g., diethylene glycol dibenzoate, dipropylene glycol dibenzoate, aliphatic phosphates, e.g., trimethyl phosphate, triethyl phosphate, tributyl phosphate, tri-2-ethyl hexyl phosphate, tributoxy phosphate; aromatic phosphates, e.g., triphenyl phosphate, tricresyl phosphate, trixylenyl phosphate, cresyl diphenyl phosphate, xylenyl diphenyl phosphate, 2-ethyl hexyl diphenyl phosphate, tris(2,6-dimethyl phenyl)phosphate, diphenyl phosphate-hydroquinone condensate ("HQDP"); halogenated aliphatic phosphates, e.g., tris(chloroethyl)phosphate, tris(β-chloropropyl) phosphate, tris(dichloropropyl) phosphate, tris(tribromoneopentyl) phosphate, and mixtures thereof.

The plasticizer may be a hydrophobic plasticizer, including aromatic esters, such as dibutyl phthalate, dioctyl phthalate, diheptyl phthalate, bis (2-ethylhexyl) phthalate, dicyclohexyl phthalate, butyl lauryl phthalate, diisooctyl phthalate, butyl-coconutalkyl phthalate, ditridecyl phthalate, dilauryl phthalate, diisodecyl phthalate, butylbenzyl phthalate, oetyldecanoyl phthalate, dimethylglycol phthalate, ethylphthalyl ethylene glycolate, methylphthalyl ethylene glycolate, butylphthalyl ethylene glycolate, dinonyl phthalate, diheptyl phthalate, octyldecyl phthalate, ditridecyl phthalate, dicapryl phthalate, bis(3,5,5-trimethylhexyl) phthalate, isooctylisodecyl phthalate, bis(diethyleneglycolmonomethylether) phthalate, and benzphenol; aliphatic esters (in the form of mono-, di-, or polyester of higher fatty acid having 8 or more carbons, preferably 8-30 carbons with di-, tri-, or polyhydric alcohol), such as glycerin monostearate, glycerin 12-hydroxy stearate, glycerin distearate, diglycerin monostearate, tetraglycerin monostearate, glycerin monolaurate, diglycerin monolaurate, tetraglycerin monolaurate, polypropylene adipate, diisodecyl adipate, bis(2-methylhexyl) adipate, dicapryl adipate, diisooctyl adipate, octyldecyl adipate, isooctylisodecyl adipate, dibutyl fumarate, dioctylfumarate, triethyl citrate, acetyltriethyl citrate, tributyl citrate, and acetyltributyl citrate; or phosphate esters, such as tricresyl phosphate, phenyldicresyl phosphate, xylenyldicresyl phosphate, cresyldixylenyl phosphate, triphenyl phosphate, tributyl phosphate, trichloroethyl phosphate, trioctyl phosphate, tributyl phosphate, trichloroethyl phosphate, trioctyl phosphate, triethyl phosphate, and arylalyl phosphate; and epoxy compounds thereof, such as butylepoxy stearate, octylepoxy stearate, epoxybutyl oleate, epoxidized butyl oleate, epoxidized soybean oil, epoxidized linseed oil, epoxidized alkyl oil, and epoxidized alkyl oil alcohol ester; and mixtures thereof.

Preferably, the plasticizer is selected from the group consisting of alkyl adipates, alkyl phthalates, alkyl azelates, alkyl benzoates, alkyl citrates, similar soy and linseed oils and suitable mixtures thereof. Most preferably, the plasticizer is dialkyl phthalate. Another suitable plasticizer for the compositions of the present invention include at least one alkyl aromatic sulfonamide containing from 6 to 40 carbon atoms total and at least six carbon atoms in the alkyl group; and/or at least one different polyether aromatic sulfonamide different and having the following structure:

$$Q\text{-}[(OCH(R)CH(R))_y\text{---}NH\text{---}SO_2\text{-}A]_z$$

where Q is selected from the following structures:

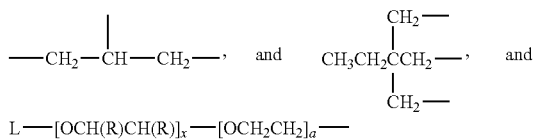

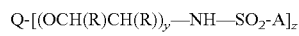

A is an aromatic group containing from 6 to 39 carbon atoms; L is an alkyl group containing from 1 to 20 carbon atoms or A-SO$_2$—NHCH(CH$_3$)CH$_2$—; R is independently hydrogen or linear or branched alkyl groups having from 1 to 4 carbon atoms; x ranges from 0 to 40; y ranges from 2 to 40; z ranges from 1 to 3; and a ranges from 0 to 40.

Preferably, at least one plasticizer is chosen from C$_3$-C$_{10}$ dialkyl adipates, C$_3$-C$_{10}$ dialkyl phthalates, and acetyl tributyl citrate and, more preferably, at least one plasticizer is chosen from dibutyl phthalate, bis(2-ethylhexyl) phthalate, diisopropyl adipate, dibutyl adipate, bis(2-ethylhexyl) adipate and acetyl tributyl citrate.

The plasticizer may also include a polymer containing a di-, tri- and/or tetra-ethyl-, propyl- and/or butylbiphenyl plasticizer which constitutes the major proportion by weight of any other plasticizing/softening additive, provided that the polymer is not polyvinyl chloride and when the polymer is an elastomer or rubber, or is a polystyrene, said plasticizer is diisopropylbiphenyl and/or triisopropylbiphenyl, and when the polymer is of a plastisol, essentially no ester plasticizing additive is present.

Other plasticized polyurethane materials suitable for the present invention include the gel compositions based on reaction products of polyols and polyisocyanates disclosed in U.S. Pat. No. 6,322,650 which is incorporated, in its entirety, by express reference thereto.

Suitable plasticizers also include esters of polybasic, preferably dibasic carboxylic acids with monohydric alcohols. The acid component of such esters may be derived for example from succinic acid, isophthalic acid, trimellitic acid, phthalic anhydride, tetrahydrophthalic anhydride and/or hexahydrophthalic anhydride, endomethylenetetrahydrophthalic anhydride, glutaric anhydride, maleic anhydride, fumaric acid and/or dimerized and/or trimerized fatty acids such as oleic acid, optionally mixed with monomeric fatty acids. The alcohol component of such esters may be derived for example from branched and/or aliphatic alcohols with 1 to 20 C atoms, such as methanol, ethanol, propanol, isopropanol, n-butanol, sec-butanol, tert-butanol, the various isomers of pentyl alcohol, hexyl alcohol, octyl alcohol (e.g., 2-ethylhexanol), nonyl alcohol, decyl alcohol, lauryl alcohol, myristyl alcohol, cetyl alcohol, stearyl alcohol and/or from naturally occurring fatty alcohols and wax alcohols or from fatty alcohols and wax alcohols obtained by hydrogenation of naturally occurring carboxylic acids. Also suitable as alcohol component are cycloaliphatic and/or aromatic hydroxy compounds, for example cyclohexanol and its homologues, phenol, cresol, thymol, carvacrol, benzyl alcohol and/or phenylethanol. Esters of the aforementioned alcohols with phosphoric acid are further suitable as plasticizers. Optionally, phosphoric acid esters of halogenated alcohols, such as for example trichloroethyl phosphate, may be used.

Flexible plasticized polyurethane foams are also suitable and typically include a foamable polyurethane compound produced by the reaction of a polyol and toluene diisocyanate, an amount of a non-halogen containing foaming agent sufficient to produce a foam from said polyurethane compound and a non-halogen containing plasticizer selected from the group consisting of phthalate plasticizers and phosphate ester plasticizers, said foam having a higher sag factor and lower normalized CFD than an equivalent polyurethane foam without plasticizer. The non-halogen containing foaming agent may be water or a non-halogen containing gas and is preferably water. The non-halogen containing plasticizer is preferably a phosphate ester and, more preferably, selected from the group consisting of 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate. If the flexible plasticized polyurethane foam is a phthalate plasticizer, it is preferably diisononyl phthalate, dihexyl phthalate, diheptyl phthalate, butyl octyl phthalate, linear dialkyl phthalate wherein said alkyl groups are independently carbon chains having from seven to eleven carbon atoms, and butyl cyclohexyl phthalate, or a mixture thereof. The non-halogen containing plasticizer may also be an alkyl aryl phthalate, and preferably is alkyl aryl phthalate is selected from the group consisting of butyl benzyl phthalate, alkyl benzyl phthalate wherein said alkyl group has a carbon chain having from seven to nine carbon atoms, and texanol benzyl phthalate. The flexible plasticized polyurethane foam may also comprise a foamable polyurethane compound produced by the reaction of a polyol and toluene diisocyanate, an amount of water sufficient to produce a foam from said polyurethane compound and phthalate plasticizer selected from the group consisting of butyl benzyl phthalate, alkyl benzyl phthalate wherein said alkyl group has a carbon chain having from seven to nine carbon atoms, texanol benzyl phthalate, diisononyl phthalate, dihexyl phthalate, diheptyl phthalate, butyloctyl phthalate, linear dialkyl phthalate wherein said alkyl groups are independently carbon chains having from seven to eleven carbon atoms, and butyl cyclohexyl phthalate, said foam having a higher sag factor and lower normalized CFD than an equivalent polyurethane foam without plasticizer. The flexible plasticized polyurethane foam may further comprise a foamable polyurethane compound produced by the reaction of a polyol and toluene diisocyanate, an amount of water sufficient to produce a foam from said polyurethane compound and a phosphate ester plasticizer selected from the group consisting of 2-ethylhexyl diphenyl phosphate, isodecyl diphenyl phosphate, mixed dodecyl and tetradecyl diphenyl phosphate, mixed dodecyl and tetradecyl diphenyl phosphate, trioctyl phosphate, tributyl phosphate, butylphenyl diphenyl phosphate and isopropylated triphenyl phosphate, said foam having a higher sag factor and lower normalized CFD than an equivalent polyurethane foam without plasticizer.

The PPU compositions of this invention may further comprise plasticizers so as to modify the rheological properties to a desired consistency. Such materials should be free of water, inert to isocyanate groups and compatible with a polymer. Suitable plasticizers preferably include alkyl phthalates such as dioctylphthalate or dibutylphthalate, partially hydrogenated terpene commercially available as HB-40®, trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired properties and which is sufficient to disperse the catalyst in the system.

Other plasticized polyurethane materials suitable for the present invention include the polysulfide-based polyurethanes disclosed in U.S. Pat. No. 6,322,650; the hydroxy acid ester plasticized urethane elastomers disclosed in U.S. Pat. No. 6,322,650; and thermoplastic polymer compositions disclosed in U.S. Pat. No. 6,322,650; which are incorporated, in their entirety, by express reference thereto.

Non-volatile ester plasticizers are also suitable for the present invention and include, but are not limited to, dimethyl phthalate, with a curative having a functionality of two and an NCO/OH equivalent ratio not over 2.0. Inert elastomers simulating mechanical properties of energetic elastomers including a nitrate ester use plasticizers, as a non-volatile ester and a mixture including a bromoaromatic derivative, having densities above and below the nitrate ester density, 1,2,4-butanetriol trinitrate being replaced with dimethyl phthalate and a mixture of pentabromodiphenyl ether and an aryl phosphate.

The invention is also directed to the use of a plasticized polyurethane gel. The plasticized polyurethane gels can be provided in various hardnesses. The plasticized polyurethane gel is preferably a soft elastomer with high sol (plasticizer) fraction which can include a high molecular weight triol (MW greater than 6000) and a diisocyanate. The polyol can be made of, for example, ARCOL® E-452 and the plasticizer can be a Paraffin oil or dipropylene glycol dibenzoate.

The plasticized polyurethane gels may be blended with butadiene style rubber, such as that prepared from oil and polyisobutadiene. Preferably, oil such as KAYDOL® and a styrene ethylene butadiene styrene triblock medium molecular weight rubber polymer such as KRATON® 1650 M. KAYDOL®D is a paraffin (55%) and naphtenic (45%). If desired, by increasing the percentage of KRATON®, the hardness of the gel can be increased. Still further, other additives, such as plastic, expanded, resilient, hollow microspheres, such as EXPANCEL® 091 DE80, expanded glass hollow microspheres, or a blowing agent can be added to the gel to reduce weight or the gel can be frothed with air using ultrasonic cavitation.

The PPU may also be foam-based. The foam can be comprised of a polyurethane foam with hollow microspheres or a blowing agent. In another embodiment, the foam can be comprised of a polyol, antifoam agent, catalyst, and isocyanate. The foam can be made of many standard foams that are available. The foam is preferably made with to a Shore C hardness of about 2 to 80, and most preferably about 10 to 50.

Thermoplastic polyurethanes suitable for blending with plasticizers for use with the present invention are disclosed in U.S. Pat. No. 6,166,135, which is incorporated herein, in its entirety, by express reference thereto. Examples of these include, but are not limited to, phthalic acid $C_{10}$-$C_{12}$ alkyl esters; di-2-ethylhexyl phthalate ("DOP"); diisooctyl phthalate ("DIOP"); diisodecyl phthalate ("DIDP"); di-n-octyl phthalate; tri-2-ethylhexyl trimellitate ("TOTM"); and tri-n-octyl trimellitate.

According to the present invention, the viscosity of the plasticized composition can be adjusted by means of the use of at least 5 parts by weight of thickening additive per 100 parts by weight of polyol and, preferably, 30 to 110 parts by weight.

Esters of divalent or polyvalent carboxylic acids are also plasticizers that can be employed according to the present invention. Examples of such polycarboxylic acids include, but are not limited to, are succinic, phthalic, trimellitic and fumaric acids, dimeric and trimeric fatty acids like oleic acid, optionally mixed with monomeric fatty acids, and phthalic, tetrahydro- and hexahydrophthalic, endomethylenetetrahydrophthalic, glutaric and maleic anhydrides. Among the alcohols which esterify the acids and the anhydrides will be mentioned branched or unbranched aliphatic alcohols which have a carbon number ranging from 1 to 20, such as methanol, ethanol, propanol, iso-propanol, n-butanol, sec-butanol, tert-butanol, the various isomers of pentyl alcohol, of hexyl alcohol, of octyl alcohol (for example 2-ethylhexanol), of nonyl alcohol, of decyl alcohol, of lauryl alcohol, of myristyl alcohol, of cetyl alcohol and of stearyl alcohol, as well as the alcohols from fatty substances and from waxes of natural origin, or obtained by hydrogenation of carboxylic acids of natural origin. Cycloaliphatic alcohols such as cyclohexanol and its homologues can be employed. It is also possible to employ aromatic hydroxy compounds such as phenol cresol, thymol, carvacrol, benzyl alcohol and phenylethyl alcohol.

Phosphorus-containing plasticizers can also be employed, such as the esters of branched or unbranched aliphatic, cycloaliphatic or aromatic alcohols referred to above and of orthophosphoric acid. Polymeric plasticizers can also be employed, such as, for example, the polyesters of adipic acid, of sebacic acid or of phthalic acid, as well as polybutadiene, polyisoprene and polyisobutene oligomers.

The compositions may also consist of synthetic polyisoprene, natural polyisoprene, polybutadiene, butyl rubber, polynorbornene, ethylene-propylene diene monomer rubber, or styrene-butadiene rubber, combined with high levels of oils, plasticizers, or fillers. The polyurethanes may also be formed by the reaction of slightly branched, substantially linear polyols having hydroxyl end groups, and having average molecular weights in the range of from about 600 g/mol to about 1200 g/mol, with an aromatic di-isocyanate in less than the stoichiometric amount. Also suitable is a three component liquid material system having an aromatic diisocyanate terminated glycol solution component, a polybutadiene polyol solution component, and a plasticizer component comprising a mixture of dialkyl and alkyl carboxylates.

Other plasticizers suitable for the invention include, but are not limited to, phthalates, adipates, sebacates, azelates, trimellitates, glutarates, benzoates, alkyl alcohols, and phosphates. Fillers suitable for the invention include pigments, ground calcium carbonates, precipitated calcium carbonates, clays, silicas, talc and mica. Thixotropes suitable for the invention include polyamides, castor oil derivatives, plastisols, silicas, microgels, and urea gels. Suitable additives include adhesion promoters, ultra violet light stabilizers, antioxidants, catalysts, theological modifiers, biocides, corrosion inhibitors, dehydrators, organic solvents, colorants, and perfumes as desired.

Other suitable materials for blending with the PPU's of the present invention include diurethanes such as those disclosed in U.S. Pat. No. 4,824,888. Diurethanes generally correspond to one of two general formulas based on isocyanate-terminated prepolymers of difunctional and trifunctional polyether or polyester polyols and/or polyvinylchloride swellable copolymers of vinyl chloride with monomers from the group vinyl acetate, vinyl propionate and alkyl acrylates. Diurethanes can be prepared by the reaction of diols with monoisocvanates and diurethanes prepared from symmetrical diisocyanates with polyether monoalcohols. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols.

Other suitable materials include moisture curing sealing and/or adhesive compositions based on alkoxysilane-terminated polyurethanes which contain diurethanes as plasticizers. These types of diurethanes are prepared from either diol mixtures and monofunctional isocyanates wherein substantially all the free hydroxyl groups are reacted, or from diisocyanates and monofunctional alcohols wherein substantially all the free isocyanate groups are reacted. Other suitable urethane plasticizers are disclosed in, for example, U.S. Pat. Nos. 4,123,413 and 4,482,408, which are incorporated herein, in their entirety, by reference. These urethane plasticizers are generally prepared by reaction of an alcohol or a phenol with an isocyanate, from amines and chloroformates, or from chloroformamides and alcohols or phenols in the presence of acid binding agents. A preferred urethane plasticizers is octyldecyl-butyl urethane which is prepared by reacting an equimolar mixture of octyldecyl isocyanate and n-butyl alcohol, for example.

Useful polyurethane plasticizers according to the present invention are also based on monoisocyanates or diisocyanates, and at least one compound selected from the group consisting of monoalcohols, polyether polyols, and mixtures thereof, having a molecular weight of more than about 4,000. They can be prepared by either adding the alcohol(s) and/or polyether polyol(s) to the monoisocyanates or diisocyanates, or by addition of the monoisocyanates or diisocyanates to the monofunctional alcohol(s) and/or polyether polyol(s).

The present invention provides a polyurethane dispersion comprising a plasticizer. The amount of plasticizer present in the polyurethane dispersion may be from about 1 to 30 parts per hundred, based on dry polyurethane weight, and preferably from about 5 to 25 parts per hundred. Typical of the plasticizers which may be used in accordance with the present invention are phthalate plasticizers such as: dimethyl phthalate, diethyl phthalate, dimethoxy-ethyl phthalate, dibutyl phthalate, butyl cyclohexyl phthalate, butyl benzyl phthalate, dibutoxy ethyl phthalate, di-2-ethylbutyl phthalate, bis(diethylene glycol monoethyl ether) phthalate, di-n-hexyl phthalate, di-2-ethylhexyl phthalate, diiso-octyl phthalate, di-2-ethylhexyl hexahydrophthalate. Other suitable plasticizers include aromatic and alkyl phosphate esters and aromatic and aliphatic esters of diacids, such as esters of alkanedioic acids and especially esters of dibenzoic acid. Adipate and sebecate plasticizers my also be used in accordance with the present invention. These plasticizers may be used alone or in combination as a mixture of plasticizers.

Any of these inventive compositions herein may be added to a conventional golf ball material for the purpose of modifying the physical properties of the parent composition. Preferably the golfball material to be modified is a core and/or cover layer comprising a thermosetting or thermoplastic polyurethane, polyurea, polyurethane ionomer, ionomer, polyamide, polybutadiene, metallocene catalyzed polyolefin or any other thermoplastic or thermosetting elastomer or rigid polymer known in the art.

The plasticized material in solid, gel, or foam form may be granulated, chopped, or otherwise formed into a particle, flake, filler, fiber, etc. and admixed to the above conventional golf ball materials for the purpose of modifying the hardness, modulus, specific gravity, strength, elongation, toughness, abrasion, or cut resistance, etc. The plasticized material may be added at a level of 1 to 99 weight % to the conventional material.

The golf ball layers of the present invention can likewise include one or more homopolymeric or copolymeric inner cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non -conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Any of the cover layers can include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing $\alpha,\beta$-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or filly neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. No. 6,180,040 and 6,180,722 disclose methods of preparing dual core golf balls. The disclosures of these patents are hereby incorporated by reference in their entirety. However, the method of the invention is not limited to the use of these techniques.

The resultant golf balls typically have a coefficient of restitution of greater than about 0.7, preferably greater than about 0.75, and more preferably greater than about 0.78. The golf balls also typically have an Atti compression of at least about 30, preferably from about 50 to 120, and more preferably from about 60 to 100. A golf ball core layer, i.e., either the innermost core or any enclosing core layer, typically has a hardness of at least about 5 Shore A, preferably between about 20 Shore A and 80 Shore D, more preferably between about 30 Shore A and 65 Shore D.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 100 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 70 Shore D, more preferably between about 25 and about 50 Shore D, and most preferably between about 40 and about 48 Shore D. The inner cover layer preferably has a material hardness of less than about 70 Shore D, more preferably between about 5 and about 70 Shore D, and most preferably, between about 20 and about 65 Shore D.

The core of the present invention has an Atti compression of less than about 120, more preferably, between about 20 and about 100, and most preferably, between about 40 and about 80. In an alternative, low compression embodiment, the core has an Atti compression less than about 20, more preferably less than about 10, and most preferably, 0.

The overall outer diameter ("OD") of the core is less than about 1.650 inches, preferably, no greater than about 1.620 inches, more preferably between about 1.500 inches and about 1.610 inches, and most preferably between about 1.52 inches to about 1.60 inches. The OD of the inner cover layer is preferably between 1.580 inches and about 1.650 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The PPU's of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and a cover, wherein the core has an outer diameter of from 1.57 inches to 1.62 inches and comprises a center and an outer core layer, and wherein at least one of the center or the outer core layer comprises a plasticized polyurethane composition comprising:
   at least one polyurethane material;
   at least one hydrophobic plasticizer selected from the group consisting of phthalates, phosphate esters, and mixtures thereof; and
   a rubber material formed from an oil and a styrene-ethylene-butylene-styrene triblock rubber polymer.

2. The golf ball of claim 1, wherein the cover comprises an inner cover layer and an outer cover layer.

3. The golf ball of claim 2, wherein at least one of the inner or outer cover layers comprises a plasticized polyurethane composition.

4. The golf ball of claim 3, wherein at least one of the inner or outer cover layer has a thickness of less than 0.05 inches.

5. The golf ball of claim 1, wherein the polyurethane material is a saturated polyurethane.

6. The golf ball of claim 1 wherein the polyurethane is produced by the reaction of a polyol and toluene diisocyanate.

7. The golf ball of claim 1, wherein the plasticizer is a phosphate ester.

8. The golf ball of claim 7, wherein the phosphate ester is isodecyl diphenyl phosphate.

9. The golf ball of claim 7, wherein the phosphate ester is selected from the group consisting of tricresyl phosphate, phenyldicresyl phosphate, xylenyldicresyl phosphate, cresyldixylenyl phosphate, triphenyl phosphate, tributyl phosphate, trichloroethyl phosphate, trioctyl phosphate, tributyl phosphate, trichloroethyl phosphate, trioctyl phosphate, triethyl phosphate, and arylalyl phosphate.

10. The golf ball of claim 1, wherein the plasticized polyurethane composition additionally comprises hollow microspheres.

* * * * *